US012337823B2

(12) United States Patent
Sun et al.

(10) Patent No.: US 12,337,823 B2
(45) Date of Patent: Jun. 24, 2025

(54) PREVENTING ELECTRIC VEHICLE BRAKE TORQUE

(71) Applicant: FORD GLOBAL TECHNOLOGIES, LLC, Dearborn, MI (US)

(72) Inventors: Xuemei Sun, Canton, MI (US); David Michael Bevan, Northville, MI (US); Jonathan Andrew Butcher, Farmington, MI (US); Carol Louise Okubo, Dearborn, MI (US); Russell Michael Charles, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 18/123,048

(22) Filed: Mar. 17, 2023

(65) Prior Publication Data

US 2024/0308498 A1  Sep. 19, 2024

(51) Int. Cl.
*B60W 20/50* (2016.01)
*B60K 6/00* (2006.01)
*B60W 10/06* (2006.01)
*B60W 10/08* (2006.01)

(52) U.S. Cl.
CPC ............... *B60W 20/50* (2013.01); *B60K 6/00* (2013.01); *B60W 10/06* (2013.01); *B60W 10/08* (2013.01); *B60W 2510/08* (2013.01); *B60W 2710/081* (2013.01); *B60W 2710/083* (2013.01); *B60W 2720/10* (2013.01); *B60Y 2200/92* (2013.01)

(58) Field of Classification Search
CPC ........ B60W 20/50; B60W 6/00; B60W 10/06; B60W 10/08; B60W 10/26; B60W 2510/08; B60W 2710/081; B60W 2710/083; B60W 2720/10; B60L 15/20; B60L 3/003; B60L 3/0046; B60L 50/51; B60L 50/60; B60L 50/70; B60L 2240/421; B60L 2240/423; B60L 2240/443; B60L 2240/12; B60L 2210/40; B60K 6/00; B60K 6/26; B60K 6/46; B60K 6/48; B60K 6/50; B60K 6/52; B60K 6/445; B60K 6/365; B60Y 2200/92; H02P 27/06
USPC .......................................................... 701/22
See application file for complete search history.

(56) References Cited

U.S. PATENT DOCUMENTS 6,124,645 A * 9/2000 Jones ................... B60L 15/2009
290/22
8,269,445 B2 9/2012 Patel et al.
9,106,162 B2 8/2015 Isayeva et al.
(Continued)

FOREIGN PATENT DOCUMENTS

DE    102017214228 A1   2/2018
WO    WO-2025008524 A1 *  1/2025   ............... H05K 5/30

*Primary Examiner* — Andrew Joseph Rudy
(74) *Attorney, Agent, or Firm* — David B. Kelley; Brooks Kushman P.C.

(57) ABSTRACT

A controller, while a motor is deactivated and a corresponding inverter is disabled, enables an engine for propulsion of a vehicle such that the motor rotates at a speed due to the propulsion, and commands variable voltage control circuitry to generate a target input voltage for the inverter that is based on a speed limit for the vehicle such that the speed of the motor corresponding to the vehicle travelling results in zero braking torque from the motor and zero charging current flow to a traction battery.

17 Claims, 4 Drawing Sheets

(56) References Cited

U.S. PATENT DOCUMENTS

| | | | | |
|---|---|---|---|---|
| 9,174,628 B2* | 11/2015 | Naqvi | ..................... | B60L 1/003 |
| 9,834,206 B1 | 12/2017 | Yang et al. | | |
| 10,812,005 B2* | 10/2020 | Kopko | ................... | H02J 9/062 |
| 11,332,001 B2* | 5/2022 | Wang | ................... | B60L 3/0046 |
| 12,049,138 B2* | 7/2024 | Sun | ....................... | B60L 15/20 |
| 2014/0062348 A1 | 3/2014 | Isayeva et al. | | |
| 2014/0358352 A1* | 12/2014 | Yamamoto | ............... | B60L 3/04 |
| | | | | 701/22 |

* cited by examiner

PREVENTING ELECTRIC VEHICLE BRAKE TORQUE

TECHNICAL FIELD

The present disclosure relates to a system for operating a hybrid vehicle or electric vehicle during a limp mode in which at least some functions of the vehicle are not available.

BACKGROUND

Hybrid vehicles or electric vehicles rely on an electric motor for propulsion. When the electric motor encounters an issue, such as overcurrent or faulted rotor position, the inverter or motor may be turned off. For hybrid vehicles, the internal combustion engine may be turned on to allow the driver to continue to drive the vehicle with limited speed. For a vehicle with multiple motors, the vehicle may rely on the motor that does not encounter any issue for temporary propulsion with limited speed.

SUMMARY

A vehicle includes a drivetrain with an engine, a traction battery, a motor, and an inverter system controller connected between the traction battery and motor. The inverter system controller includes an inverter and variable voltage control circuitry that boosts an input voltage to the inverter. The vehicle also includes a controller that, responsive to detecting a predefined condition, turns off the inverter and deactivates the motor and enables the engine for propulsion of the vehicle such that the motor rotates at a speed due to the propulsion, and commands the variable voltage control circuitry to generate a target input voltage for the inverter that is based on a speed limit for the vehicle such that the speed of the motor corresponding to the vehicle travelling results in no charging current flow to the traction battery.

A method for a vehicle includes, while a motor is deactivated and a corresponding inverter is turned off, enabling an engine for propulsion of the vehicle such that the motor rotates at a speed due to the propulsion, and commanding variable voltage control circuitry to generate a target input voltage for the inverter that is based on a speed limit for the vehicle such that the speed of the motor corresponding to the vehicle travelling results in no charging current flow to a traction battery.

A system for a vehicle includes a controller that, while a motor is deactivated and a corresponding inverter is disabled, enables an engine for propulsion of the vehicle such that the motor rotates at a speed due to the propulsion, and commands variable voltage control circuitry to generate a target input voltage for the inverter that is based on a speed limit for the vehicle such that the speed of the motor corresponding to the vehicle travelling results in zero braking torque from the motor and zero charging current flow to a traction battery.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system for operating an electric vehicle (EV) or hybrid vehicle during a limp mode in which at least some functions of the vehicle are not available.

Figure 1:
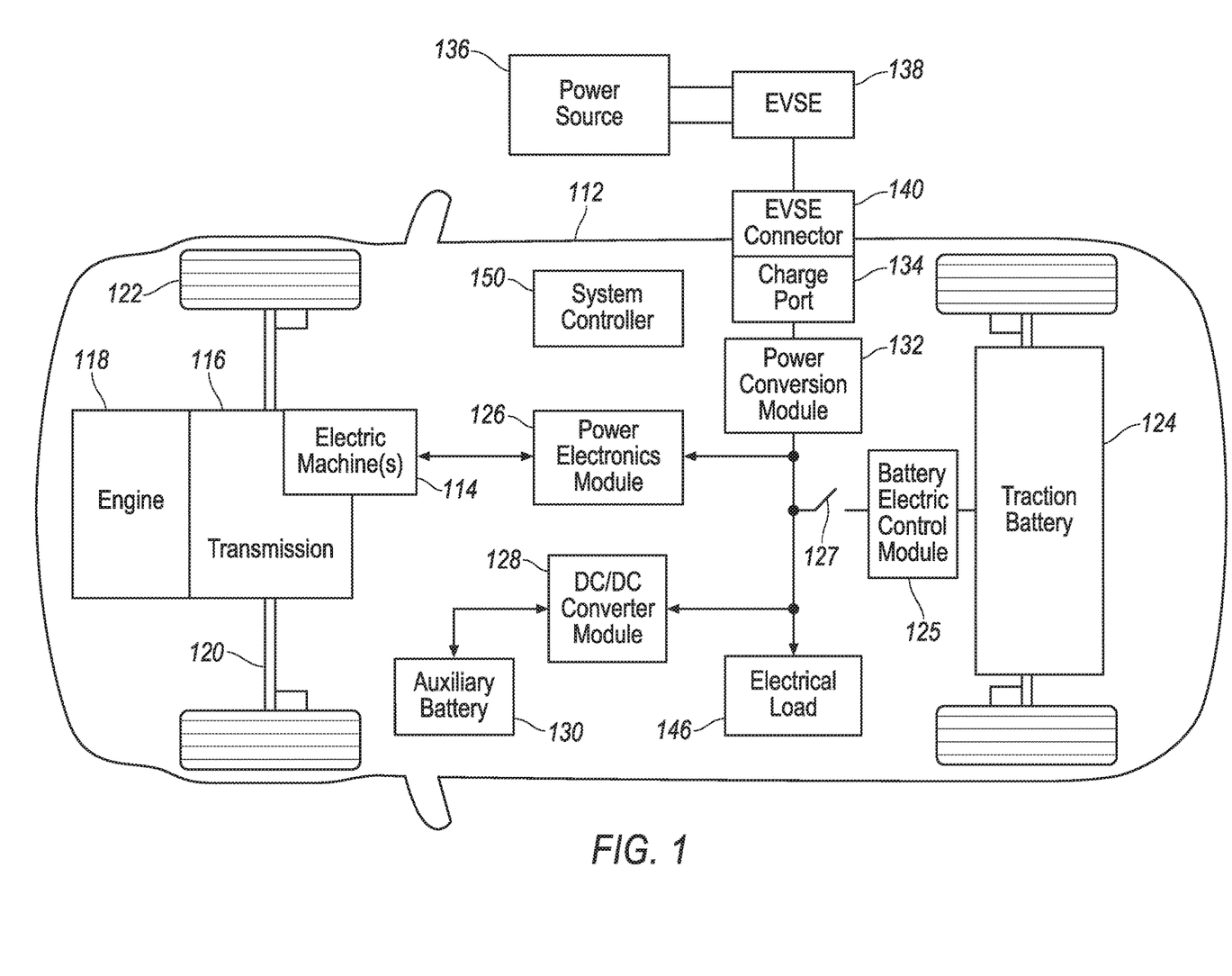
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and braking capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. In case that more than one electric machines 114 are provided, each electric machine 114 may be configured to independently provide propulsion power to different wheels of the vehicle 112. For instance, a first electric machine 114 may be coupled and provide torque to the front wheels, and a second electric machine 114 may be coupled and provide torque to the rear wheels.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present. The power electronics module 126 may be provided with a variable voltage control (VVC) function to transform the voltage between the traction battery 124 and the electric machines 114 (to be discussed in detail below).

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the battery 124 via the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operation of the components. The controllers may communicate via a serial bus (e.g., Controller Area Network (CAN)) or via discrete conductors. A system controller 150 may be present to coordinate the operation of the various components. It is noted that the system controller 150 is used as a general term and may include one or more controller devices configured to perform various operations in the present disclosure. For instance, the system controller 150 may be programmed to enable a powertrain control function to operate the powertrain of the vehicle 112. The system controller 150 may be further programmed to enable a telecommunication function with various entities (e.g. a server) via a wireless network (e.g. a cellular network).

Figure 2:
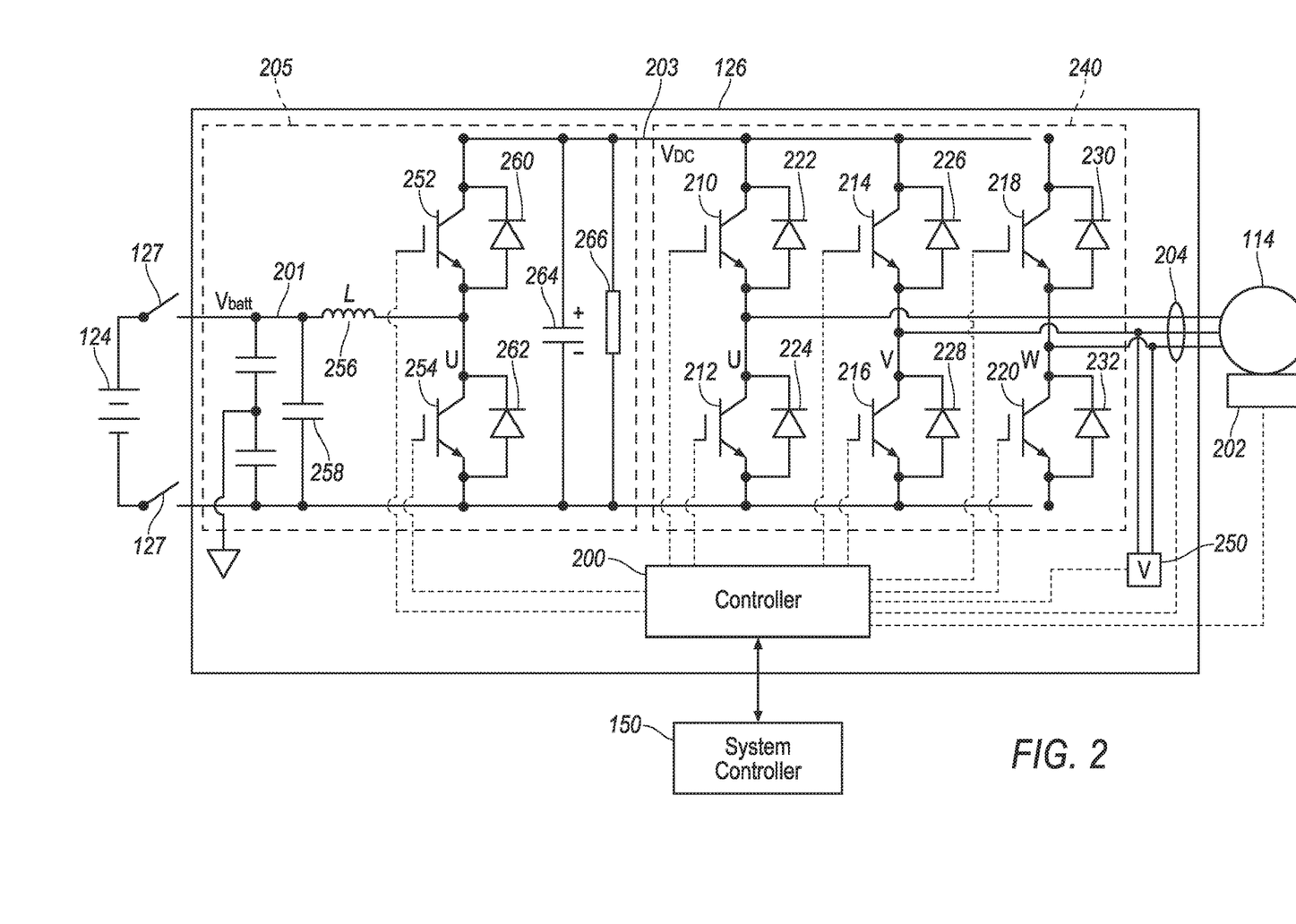
FIG. 2 illustrates a diagram of a variable voltage control (VVC) power inverter for an electric machine.

The electric machines 114 may be coupled to the power electronics module 126 via one or more conductors that are associated with each of the phase windings. FIG. 2 depicts a block diagram of a portion of an electric drive system for a vehicle. The vehicle 112 may include one or more power electronics controllers 200 configured to monitor and control the components of the power electronics module 126. The power electronics controllers 200 may be under a global control or coordination of the system controllers 150. Further coordination by the system controllers 150 may be by the main contactors 127 connected between the power electronics module 126 and the in traction battery 124. As illustrated in the present example, the main contactors 127 may be connected on positive and negative terminals of a battery bus (battery rail) 201.

The conductors may be part of a wiring harness between the electric machine 114 and the power electronics module 126. A three-phase electric machine 114 may have three conductors coupled to the power electronics module 126. The power electronics module 126 may be configured to switch positive and negative terminals of a high-voltage DC bus (DC rail) 203 to phase terminals of the electric machines 114. The power electronics module 126 may be controlled to provide a pulse-width modulated (PWM) voltage and sinusoidal current signals to the electric machine 114. The frequency of the signals may be proportional to the rotational speed of the electric machine 114. The controller 200 may be configured to adjust the voltage and current output of the power electronics module 126 at a predetermined switching frequency. The switching frequency may be the rate at which the states of switching devices within the power electronics module 126 are changed.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics module 126 may include a power electronics controller 200 that interfaces to the speed feedback device 202 and processes signals from the speed feedback device 202. The power electronics controller 200 may be programmed to utilize the speed and position feedback to control the power electronics module 126 to operate the electric machine 114.

The power electronics module 126 may include power switching circuitry 240 configured to supply electric power from the DC bus 203 to the electric machine 114. The power switching circuitry 240 may include a plurality of switching devices 210, 212, 214, 216, 218, 220. The switching devices 210, 212, 214, 216, 218, 220 may be Insulated Gate Bipolar Transistors (IGBT), Metal Oxide Semiconductor Field Effect Transistors (MOSFET), or other solid-state switching devices. The switching devices 210, 212, 214, 216, 218, 220 may be configured to selectively couple a positive terminal and a negative terminal of the DC bus 203 to each phase terminal or leg (e.g., labeled U, V, W) of the electric machine 114. The power electronics 126 may be configured to provide a U-phase voltage, a V-phase voltage and a W-phase voltage to the electric machine 114. Each of the switching devices 210, 212, 214, 216, 218, 220 within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A phase leg of the power electronics module 126 may include switching devices and circuitry configured to selectively connect a phase terminal of the electric machine 114 to each terminal of the DC bus 203. A first switching device 210 may selectively couple the DC bus positive terminal to a first phase terminal (e.g., U) of the electric machine 114. A first diode 222 may be coupled in parallel to the first switching device 210. A second switching device 212 may selectively couple the DC bus negative terminal to the first phase terminal (e.g., U) of the electric machine 114. A second diode 224 may be coupled in parallel to the second switching device 212. A first inverter phase leg may include the first switching device 210, the first diode 222, the second switching device 212, and the second diode 224.

A third switching device 214 may selectively couple the DC bus positive terminal to a second phase terminal (e.g., V) of the electric machine 114. A third diode 226 may be coupled in parallel to the third switching device 214. A fourth switching device 216 may selectively couple the DC bus negative terminal to the second phase terminal (e.g., V) of the electric machine 114. A fourth diode 228 may be coupled in parallel to the fourth switching device 216. A second inverter phase leg may include the third switching device 214, the third diode 226, the fourth switching device 216, and the fourth diode 228.

A fifth switching device 218 may selectively couple the DC bus positive terminal to a third phase terminal (e.g., W) of the electric machine 114. A fifth diode 230 may be coupled in parallel to the fifth switching device 218. A sixth switching device 220 may selectively couple the DC bus negative terminal to the third phase terminal (e.g., W) of the electric machine 114. A sixth diode 232 may be coupled in parallel to the sixth switching device 220. A third inverter phase leg may include the fifth switching device 218, the fifth diode 230, the sixth switching device 220, and the sixth diode 232.

The power switching devices 210, 212, 214, 216, 218, 220 may include two terminals that handle the high-power current through the power switching device. For example, an IGBT includes a collector (C) terminal and an emitter (E) terminal and a MOSFET includes a drain terminal (D) and a source (S) terminal. The power switching devices 210, 212, 214, 216, 218, 220 may further include one or more control inputs. For example, the power switching devices 210, 212, 214, 216, 218, 220 may include a gate terminal (G) and a Kelvin source/emitter (K) terminal. The G and K terminals may comprise a gate loop to control the power switching device.

The power electronics module 126 may be configured to flow a rated current and have an associated power rating. Some applications may demand higher power and/or current ratings for proper operation of the electric machine 114. The power switching circuitry 240 may be designed to include power switching devices 210, 212, 214, 216, 218, 220 that can handle the desired power/current rating. The desired power/current rating may also be achieved by using power switching devices that are electrically coupled in parallel. Power switching devices may be electrically coupled in parallel and controlled with a common control signal so that each power switching device flows a portion of the total current flowing to/from the load.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the DC bus positive terminal or the DC bus negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measured values of the phase currents of the electric machine 114 may be stored in controller memory for later computations.

The power electronics module 126 may be configured to enable a VVC scheme by transforming voltages on the battery bus 201 and the DC bus 203 using a VVC circuitry 205. More specifically, the electric machine 114 may be configured to support higher voltages compared with the voltage provided by the traction battery 124. Therefore, voltage VDC on the DC bus 203 may be higher than voltage Vbatt on the battery bus 201. The VVC circuitry 205 may be used to increase (boost) the lower voltage on the battery bus 201 to a higher level for supplying to the DC bus 203 to satisfy the voltage demand of the electric machine 114 during a driving mode when the traction battery 124 is discharged. The VVC circuitry 205 may be used to decrease (buck) the higher voltage on the DC bus 203 to a lower level for supplying to the battery bus 201 to accommodate the voltage of the traction battery 124 during a regenerative mode when the traction battery 124 is charged.

The VVC circuitry 205 may include a plurality of switching devices 252, 254, an inductor 256, a battery bus capacitor 258, a DC bus capacitor 264, and a load resistor 266. The switching devices 252, 254 may be IGBT, MOSFET, or other solid-state switching devices. The switching devices 252, 254 may be configured to selectively couple the positive terminal of the battery bus 201 to each of the positive terminal and negative terminal of the DC bus 203 to perform the voltage transformation between the battery bus 201 and the DC bus 203. More specifically, a seventh switching device 252 may selectively couple the positive terminal of the battery bus 201 to the positive terminal of the DC bus 203. A seventh diode 260 may be coupled in parallel to the seventh switching device 252. An eighth switching device 254 may selectively couple the negative terminal of the battery bus 201 to the negative terminal of the DC bus 203. An eighth diode 262 may be coupled in parallel to the eighth switching device 254. The battery bus capacitor 258 may be connected between the positive and negative terminals of the battery bus 201 to maintain the voltage of the battery bus 201. The DC bus capacitor 264 may be connected between the positive and negative terminals of the DC bus 203 to maintain the voltage of the DC bus 203.

The VVC circuitry 205 may be configured to operate in a boost mode to increase the voltage from the traction battery 124 when the battery is discharged to supply electric power to the electric machine 114. In the boost mode, the eighth switching device 254 may be periodically opened and closed (e.g. driven with PWM signals) to increase the voltage from the battery bus 201 to supply to the DC bus 203. More specifically, when the eighth switching device 254 is closed, an electric current from the traction battery 124 may flow through the inductor 256 which creates a magnetic field. When the eighth switching device 254 is open, the magnetic field may not reduce immediately due to the nature of the inductor 256. Instead, the magnetic field from the inductor 256 may generate a current which may charge the DC bus capacitor 264 via the seventh diode 260 creating an increased voltage between the positive and negative terminals of the DC bus capacitor 264. Since the positive and negative terminals of the DC bus capacitor 264 are directly connected to the positive and negative terminals of the DC bus 203, the voltage across the DC bus capacitor 264 is equal to the DC bus voltage VDC. When the eighth switching device 254 is subsequently closed again, the magnetic field is resumed by the current flowing through the inductor 256. The repeated opening and closing of the eighth switching device 254 may cause current to add to the voltage VDC across the DC bus capacitor 264. The process repeats until a preset DC bus voltage is reached. During the buck mode, the seventh switching device is closed. Similarly, the VVC circuit 205 may be used to reduce the voltage from the DC bus 203 to charge the battery 124 by periodically opening and closing the seventh switching device under the similar concept.

Figure 3A:
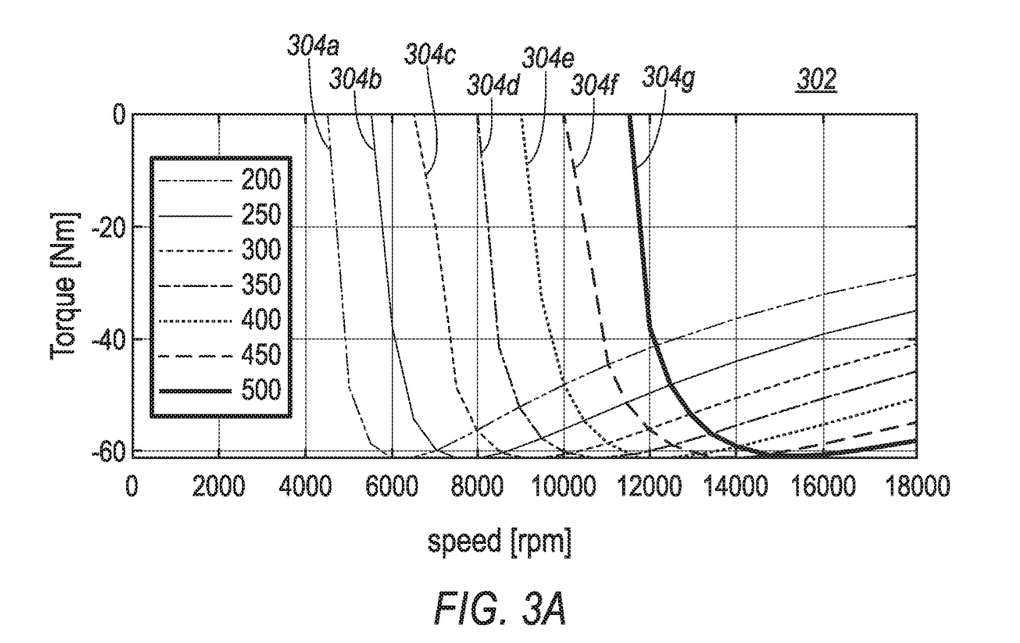
FIGS. 3A and 3B illustrate waveform diagrams of motor Brake Torque at different speeds and inverter input voltages.
Figure 3B:
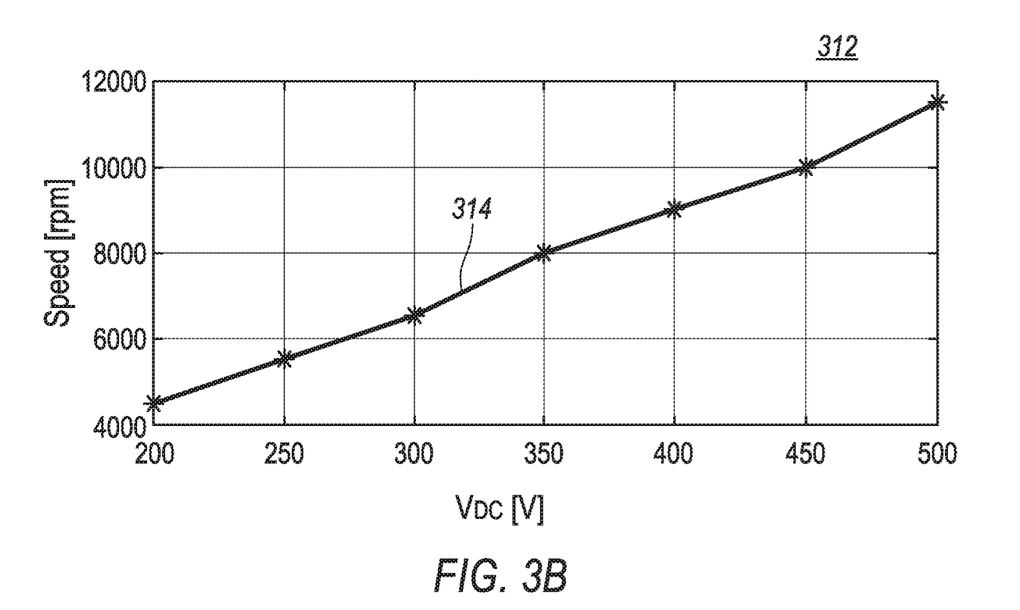

When the controller detects motor faults, such as phase overcurrent or motor position sensing faults, the common action is to disable the inverter switches 210, 212, 214, 216, 218, 220. The deactivated motor might generate negative torque, called Brake Torque, if it rotates at high speed passing the motor's knee point. Referring to FIGS. 3A and 3B, waveform diagrams of Brake Torque output of the electric machine 114 are illustrated. Comparing vehicle regenerative mode during normal operation with the limp home mode with inverter all-switches-off, the regenerative torque may be controlled as desired and used to charge the vehicle battery 124 by converting the motion energy into electric energy using the power electronics module 126. However, in the limp mode, the Brake Torque generating electric charge may be uncontrollable and undesirable when battery SOC is high. For instance, responsive to detecting an electric machine-related issue, a hybrid vehicle may disable the electric machine 114 and entirely rely on the engine 118 for temporary propulsion to reach a designated location (e.g. a repair shop). Additionally or alternatively, if more than one electric machine is provided, the vehicle 112 may use the issue-free electric machine 114 for propulsion. As the vehicle wheels spin, the Brake Torque from the electric machine 114 at issue may generate unwanted charging current to the traction battery 124.

FIG. 3A illustrates a waveform diagram of the Brake Torque versus motor speed relationship at different inverter input voltages, and FIG. 3B illustrates a waveform of the maximum speed at zero Brake Torque at different inverter input voltage levels. Referring to the waveform diagram 302 illustrated in FIG. 3A, the horizontal axis of the diagram indicates a rotation speed of the electric machine 114 in units of revolution per minute (rpm) and the vertical axis indicates a Brake Torque in units of Newton meter (Nm) generated by the rotation. Multiple waveforms 304a-g corresponding to different DC bus voltages are presented in in FIG. 3A demonstrating non-zero Brake Torque is shifted to high motor speed with higher DC bus voltages. In the present example, the battery bus voltage (e.g. voltage of the transaction battery) may be a fixed voltage of 200V, whereas the electric machine 114 may support a variable voltage range between 200V and 500V. Therefore, the DC bus voltage may be transformed by the VVC circuitry 205 within the 200-500V range. Each of the waveforms 304a-g corresponds to a specific DC bus voltage. For instance, the first waveform 304a illustrates a Brake Torque variation at different rotation speeds when the DC bus voltage is 200V. The second waveform 304b illustrates a brake torque variation at different rotation speeds when the DC bus voltage is 250V. The third waveform 304c illustrates a Brake Torque variation at different rotation speeds when the DC bus voltage is 300V. The fourth waveform 304d illustrates a Brake Torque variation at different rotation speeds when the DC bus voltage is 350V. The fifth waveform 304e illustrates a Brake Torque variation at different rotation speeds when the DC bus voltage is 400V. The sixth waveform 304f illustrates a Brake Torque variation at different rotation speeds when the DC bus voltage is 450V. The seventh waveform 304g illustrates a Brake Torque variation at different rotation speeds when the DC bus voltage is 500V. As illustrated in FIG. 3A, all of the waveforms 304a-g generally follow a "V" or "tick" shape/pattern starting at a different rotation speeds. Taking the first waveform 304a at 200V DC bus voltage for instance, the Brake Torque does not occur until the rotation speed of the electric machine 114 reaches 4500 rpm. As the rotation speed reaches about 4500 rpm and continues to increase, the Brake Torque increases significantly and peaks at about-60 Nm at around 6000 rpm, from which the Brake Torque starts to decrease. The second waveform 304b generally follows the same trend as the first waveform 304b but is shifted up for about 1000 rpm. More specifically, when the DC bus voltage is at 250V, the Brake Torque does not occur until the electric machine reaches about 5500 rpm and the Brake Torque peaks at about 7000 rpm. Each of the rest of the waveforms 304c-g follows the same pattern and speed shifts up as DC bus voltage increases. It is noted that the Brake Torque is a negative torque because the torque creates a dragging effect in the direction opposite to the vehicle travel direction.

Referring to the waveform diagram 312 illustrated in FIG. 3B, a voltage waveform 314 corresponds to the Brake Torque waveforms 304a-g illustrated in FIG. 3A. The horizontal axis of the waveform diagram 312 indicates a voltage on the DC bus 203 in units of volts and the vertical axis indicates the rotation speed of the electric machine 114 in units of rpm. More specifically, the voltage waveform diagram 312 illustrates a minimum rotation speed of the electric machine to generate Brake Torque at a voltage on the DC bus 203. For instance, the minimum speed of the electric machine 114 to generate Brake Torque at 200V DC bus voltage is around 4500 rpm. The minimum speed of the electric machine 114 to generate Brake Torque at 250V DC bus voltage is around 5500 rpm. The minimum speed of the electric machine 114 to generate Brake Torque at 300V DC bus voltage is around 6500 rpm. The minimum speed of the electric machine 114 to generate Brake Torque at 350V DC bus voltage is around 8000 rpm. The minimum speed of the electric machine 114 to generate Brake Torque at 400V DC bus voltage is around 9000 rpm. The minimum speed of the electric machine 114 to generate Brake Torque at 450V DC bus voltage is around 10000 rpm. The minimum speed of the electric machine 114 to generate Brake Torque at 500V DC bus voltage is around 11500 rpm. In general, the higher the inverter input voltage is, the higher motor speed that does not generate Brake Torque.

It may be more desirable by the driver to be able to drive the vehicle at higher speed, and this can be achieved when the VVC circuitry 205 operates at a higher DC bus voltage boost mode. For instance, while the vehicle 112 operates in the limp mode and a current generated by the Brake Torque is undesirable at high battery SOC, the system controller 150 may boost the DC bus voltage to 500V and limit the motor speed to 11500 rpm. In general, the speed limit may increase when the VVC circuitry 205 operates at a higher DC bus voltage boost mode which may be more desirable by the driver.

When the vehicle configuration does not have VVC circuitry 205, or VVC circuitry 205 could not boost for any reason, the vehicle 112 could impose an electronic speed limit to prevent the vehicle from going over the minimum speed of the electric machine 114 to generate the Brake Torque at the DC voltage. For instance, at 200V DC bus voltage, the speed limit may correspond to the 4500 rpm electric machine rotation speed. at 250V DC bus voltage, the speed limit may correspond to the 5500 rpm electric machine rotation speed which is higher than the speed limit of the 200V DC bus voltage.

Figure 4:
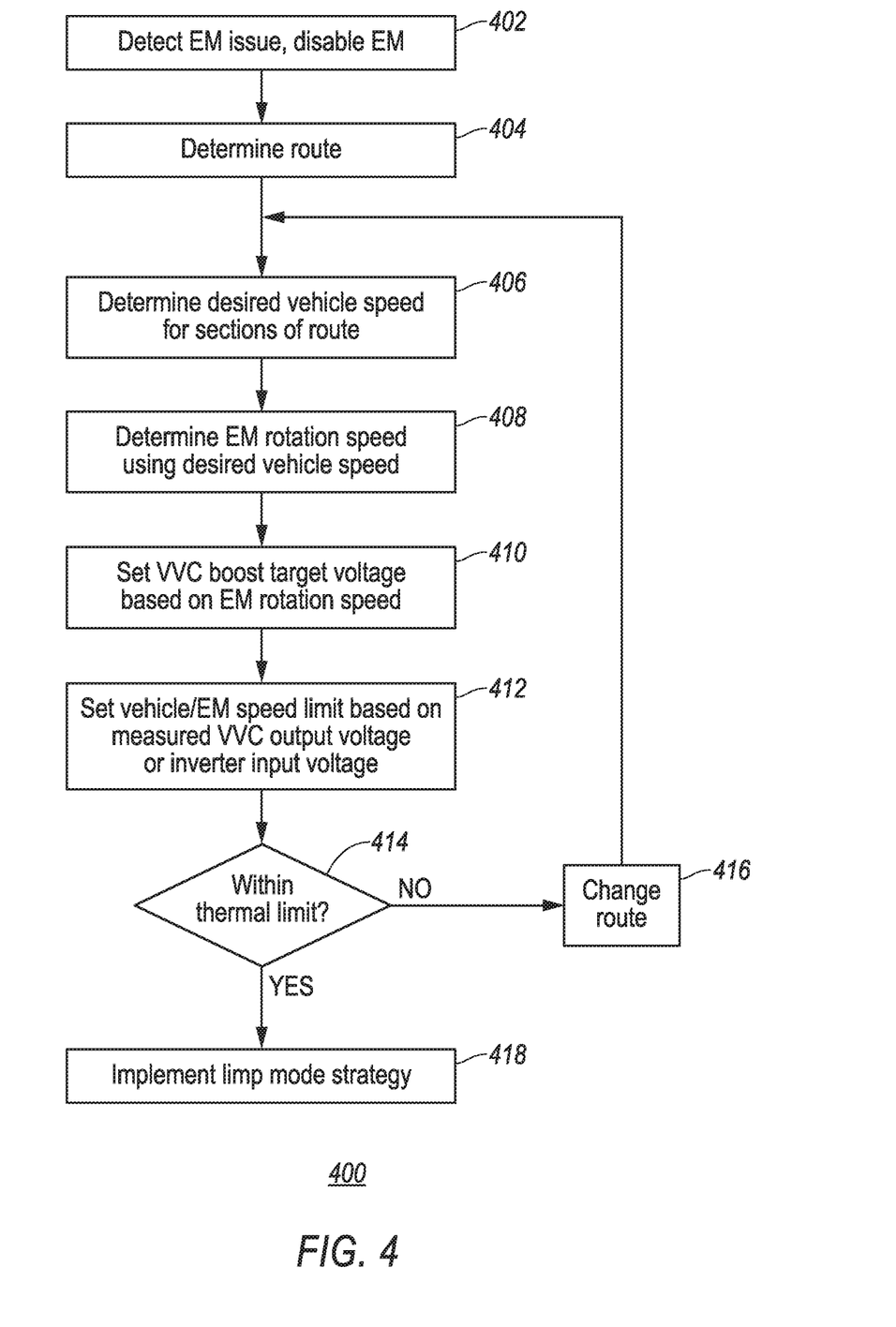
FIG. 4 illustrates a flow diagram of a process for operating the vehicle in a limp mode.

Referring to FIG. 4, a process 400 for operating the vehicle in the limp mode is illustrated. With continuing reference to FIGS. 1-3, the process 400 may be individually or collectively implemented via one or more of the system controller 150, the BECM 125, the power electronics module controller 200 and other components of the vehicle 112. For simplicity, the following description will be made with reference to the system controller 150. At operation 402, responsive to detecting an issue related to the electric machine 114 has occurred, the system controller 150 enables a limp driving mode and disables the electric machine 114. The vehicle 112 may allowed to be driven by the internal combustion engine 118 and/or other electric machines whichever is available depending on the specific configuration of the vehicle 112. At operation 404, the system controller 150 determines a route for the limp mode driving. For instance, the system controller 150 may identify a destination such as a repair shop or the driver's home and determines a route for the vehicle to arrive at the destination. Depending on the distance from the destination, the route may be divided into a plurality of sections. For instance, the route may include one or more sections of city driving and one or more sections of highway driving each corresponding to a different driving condition such as driving speed. At operation 406, the system controller 150 determines a desired vehicle speed for each section of the route. In general, sections of highway driving may be associated with a higher desired speed compared with sections of city driving. The system controller 150 may further use information related to the weather and traffic condition of the route to determine the desired speed. As an example, rainy weather and heavy traffic conditions may decrease the desired vehicle speed. With the desired vehicle speed determined, at operation 408, the system controller 150 converts the vehicle speed into the rotation speed of the electric machine 114 for each section of the route. Since the electric machine 114 is coupled to the vehicle wheels 122 via mechanisms (such as a gear box) with a known transmission ratio, the motor rotation speed may be converted based on the vehicle speed and the transmission ratio.

At operation 410, the system controller 150 sets a VVC boost target voltage (e.g. voltage on the DC bus 203) based on the rotation speed of the electric machine in a manner that no Brake Torque is generated. For instance, as illustrated in FIG. 3B, the system controller 150 may set the boost target voltage above the zero-brake-torque voltage based on the desired rotation speed of the electric machine 114. Alternatively, in case that the power electronics module 126 is not provided with the VVC circuitry 205, operation 410 may be ignored and the process directly proceeds to operation 412 to set the speed limit. At operation 412, the system controller 150 sets an electric machine and vehicle speed limit based on the measured DC bus voltage such that the vehicle may not be allowed to operate above a speed at each section of the route that generates a Brake Torque, and hence no regenerative voltage/current is generated on the DC bus 203. At operation 414, the system controller 150 determines the thermal profile of the VVC circuitry based on the boost target voltage and the associated duration, and determines if the thermal profile is within the thermal limit of the power electronics module 126. If the answer is no indicative of too much heat being generated on the current route, the process proceeds to operation 416 and the system controller 150 modifies the vehicle route. For instance, the system controller may modify the route by replacing a part of highway driving with city driving to decrease the total thermal profile on the route. Otherwise, if the thermal profile is within the thermal limit, the process proceeds from operation 414 to operation 418 to implement the limp mode strategy. For instance, the system controller may implement the route as planned and impose the speed limiting on the vehicle 112 such that no Brake Torque current is generated during the limp mode.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a drivetrain including an engine, a traction battery, a motor, and an inverter system controller connected between the traction battery and motor, and including an inverter and variable voltage control circuitry configured to boost an input voltage to the inverter; and
a controller programmed to, responsive to detecting a predefined condition,
turn the inverter off to deactivate the motor and enable the engine for propulsion of the vehicle such that the motor rotates at a speed due to the propulsion, and command the variable voltage control circuitry to generate a target input voltage for the inverter that is based on a speed limit for the vehicle such that the speed of the motor corresponding to the vehicle travelling does not result in charging current flow to the traction battery.

2. The vehicle of claim 1, wherein the controller is further programmed to prevent the vehicle from exceeding the speed limit during presence of the predefined condition.

3. The vehicle of claim 1, wherein the target input voltage increases as the speed limit increases.

4. The vehicle of claim 1, wherein the predefined condition is a fault of the motor.

5. The vehicle of claim 1, wherein the controller is further programmed to, responsive to detecting the predefined condition, disable the inverter.

6. The vehicle of claim 1, wherein the controller is further programmed to, responsive to detecting the predefined condition and a temperature associated with the inverter system controller exceeding a threshold, prevent the vehicle from exceeding a second speed limit that is based on a voltage of the traction battery.

7. The vehicle of claim 6, wherein the second speed limit decreases as the voltage decreases.

8. A method for a vehicle comprising:
while a motor is deactivated and a corresponding inverter is disabled, enabling an engine for propulsion of the vehicle such that the motor rotates at a speed due to the propulsion, and commanding variable voltage control circuitry to generate a target input voltage for the inverter that is based on a speed limit for the vehicle such that the speed of the motor corresponding to the vehicle travelling results in no charging current flow to a traction battery.

9. The method of claim 8 further comprising preventing the vehicle from exceeding the speed limit during presence of a predefined condition.

10. The method of claim 9, wherein the predefined condition is a fault of the motor.

11. The method of claim 8, wherein the target input voltage increases as the speed limit increases.

12. The method of claim 8 further comprising, while the motor is deactivated, the inverter is disabled, and a temperature associated with the variable voltage control circuitry exceeds a threshold, preventing the vehicle from exceeding a second speed limit that is based on a voltage of the traction battery.

13. The method of claim 12, wherein the second speed limit decreases as the voltage decreases.

14. A system for a vehicle, comprising
a controller programmed to, while a motor is deactivated and a corresponding inverter is disabled, enable an engine for propulsion of the vehicle such that the motor rotates at a speed due to the propulsion, and limit a speed of the vehicle such that the speed of the motor corresponding to the vehicle travelling results in zero braking torque.

15. The system of claim 14, wherein the controller is further programmed to, while the motor is deactivated, the inverter is disabled, and a temperature associated with the inverter exceeds a threshold, prevent the vehicle from exceeding a second speed limit that is based on a voltage of a traction battery.

16. The system of claim 15, wherein the second speed limit decreases as the voltage decreases.

17. The system of claim 14, wherein the controller is further programmed to prevent the vehicle from exceeding the speed limit.

* * * * *